(12) United States Patent
Mueller et al.

(10) Patent No.: US 11,600,971 B2
(45) Date of Patent: Mar. 7, 2023

(54) PRECHAMBER SPARK PLUG HAVING AN ADAPTED CAP GEOMETRY

(71) Applicant: Robert Bosch GmbH, Stuttgart (DE)

(72) Inventors: Bernd Mueller, Korntal-Muenchingen (DE); Stephan Kaske, Sternenfels Diefenbach (DE); Thomas Steidten, Ludwigsburg (DE); Ugur Yilmaz, Markgroeningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/603,245

(22) PCT Filed: Mar. 25, 2020

(86) PCT No.: PCT/EP2020/058437
§ 371 (c)(1),
(2) Date: Oct. 12, 2021

(87) PCT Pub. No.: WO2020/212106
PCT Pub. Date: Oct. 22, 2020

(65) Prior Publication Data
US 2022/0181853 A1 Jun. 9, 2022

(30) Foreign Application Priority Data
Apr. 16, 2019 (DE) .......................... 102019205478.1

(51) Int. Cl.
*H01T 13/54* (2006.01)
*H01T 13/16* (2006.01)

(52) U.S. Cl.
CPC ............ *H01T 13/16* (2013.01); *H01T 13/54* (2013.01)

(58) Field of Classification Search
CPC ...................................................... H01T 13/54
USPC ....................................................... 313/143
See application file for complete search history.

(56) References Cited

U.S. PATENT DOCUMENTS

| 2,047,575 A | 7/1936 | Burtnett |
| 3,921,605 A * | 11/1975 | Wyczalek ............... F02B 19/12 |
| | | 313/231.01 |
| 9,745,892 B2 | 8/2017 | Sotiropoulou et al. |
| 10,024,220 B2 * | 7/2018 | Sotiropoulou .......... F02B 19/12 |

(Continued)

FOREIGN PATENT DOCUMENTS

| DE | 102013223721 A1 † | 5/2015 |
| DE | 102015105915 A1 | 4/2016 |

(Continued)

OTHER PUBLICATIONS

International Search Report for PCT/EP2020/058437, dated Jun. 26, 2020.

*Primary Examiner* — Christopher M Raabe
(74) *Attorney, Agent, or Firm* — Norton Rose Fulbright US LLP; Gerard Messina

(57) ABSTRACT

A prechamber spark plug. The prechamber spark plug includes: a housing, and a cap which has at least one pass-through opening, the cap being situated at a combustion chamber-side end of the housing. The cap and the housing form a prechamber. An outer cap surface area of the cap, which faces away from the prechamber, has at least one predefined ratio to respectively one further geometric feature of the cap.

13 Claims, 3 Drawing Sheets

(56) References Cited

U.S. PATENT DOCUMENTS

| | | |
|---|---|---|
| 2012/0125287 A1 | 5/2012 | Chiera et al. |
| 2014/0102404 A1 † | 4/2014 | Sotiropoulou |
| 2016/0053670 A1* | 2/2016 | Tozzi .................... F02P 13/00 123/260 |
| 2017/0145898 A1* | 5/2017 | Schafer .................. F02P 13/00 |
| 2021/0135433 A1* | 5/2021 | Kuhnert ................. H01T 13/54 |

FOREIGN PATENT DOCUMENTS

| | | |
|---|---|---|
| DE | 102017204241 A1 | 9/2018 |
| EP | 1476926 A1 | 11/2004 |
| EP | 3173596 A1 | 5/2017 |
| JP | 2013-73709 A † | 4/2013 |
| JP | 2013073709 A | 4/2013 |
| WO | 03071644 A1 | 8/2003 |
| WO | 2007092972 A1 | 8/2007 |

\* cited by examiner
† cited by third party

A - A

US 11,600,971 B2

PRECHAMBER SPARK PLUG HAVING AN ADAPTED CAP GEOMETRY

FIELD

The present invention relates to a prechamber spark plug having an improved heat dissipation due to an adapted cap geometry.

BACKGROUND INFORMATION

Prechamber spark plugs for internal combustion engines are described in the related art. German Patent Application No. DE 10 2017 204 A1 shows such a prechamber spark plug, for example. As in conventional spark plugs, prechamber spark plugs comprise a center electrode situated in a housing and a ground electrode, which define between each other a spark gap, in which an air-fuel mixture is ignited. This ignited air-fuel mixture is subsequently conducted through openings in a cap located at the combustion chamber-side end of the prechamber spark plug into a main combustion chamber, in which the actual combustion of an air-fuel mixture for the piston stroke occurs.

Especially the cap is subject to strong temperature effects in the operation of the prechamber spark plug. Insufficient heat dissipation in the prechamber spark plug may result in a heat accumulation at the cap, which may result in unwanted spontaneous ignitions and thus in increased cap and electrode wear. Furthermore, uncontrolled ignitions may result in damage to the internal combustion engine.

SUMMARY

A prechamber spark plug according to an example embodiment of the present invention has improved heat absorption and heat dissipation via a outer cap surface of the cap. An accumulation of heat at the cap of the prechamber spark plug is thereby reduced and unwanted spontaneous ignitions due to excessively high temperatures of the cap may be avoided. According to an example embodiment of the present invention, this is achieved by a prechamber spark plug including a housing including and a cap. The cap is situated on a combustion chamber-side end of the housing, viewed in the axial direction of the prechamber spark plug. The cap and the housing together form a prechamber. At least one pass-through opening is developed in the cap, which allows for gases to pass from the prechamber through the cap and into the combustion chamber. A first ignition occurs in the prechamber, torch jets passing through the cap via the pass-through opening and igniting the fuel-air mixture in the combustion chamber. To achieve the optimized heat absorption and heat dissipation, an outer surface area of the cap facing away from the prechamber is provided in at least one predefined ratio to respectively one further geometric feature of the cap. Advantageously, the outer cap surface area is 130 mm². The outer cap surface preferably has a predefined ratio with multiple different geometric features respectively.

That is, the geometry of the cap is adapted in such a way that an improved heat absorption and heat dissipation is achieved via the outer cap surface and that thus an accumulation of heat at the cap is prevented. In particular, the special area ratios also promote heat conduction from the cap to the housing. This reduces a thermal load of the cap in the operation of the prechamber spark plug and increases a service life of the prechamber spark plug. In particular, temperatures of the cap are reduced by an optimized heat transfer, whereby uncontrolled spontaneous ignitions at the cap may be prevented, which further has an advantageous effect on the service life of the cap and thus also of the prechamber spark plug. When used in an internal combustion engine, the prechamber spark plug thus allows for particularly controlled ignitions of the fuel-air mixture. By preventing uncontrolled spontaneous ignitions, damage to the internal combustion engine is also prevented and a particularly efficient operation is made possible.

Preferred developments of the present invention are disclosed herein.

Preferably, a first geometric feature is an inner cap surface of the cap facing the prechamber. A first ratio of the outer cap surface area to the inner cap surface area is at least 1:1 and maximally 3:1. Particularly preferably, the first ratio is 2.167:1. Advantageously, at an outer cap surface area of 130 mm² and a first ratio of 2.167:1, the inner cap surface area is approximately 60 mm². A particularly favorable ratio of heat absorption and heat dissipation is thereby achieved across the surfaces of the cap. Above all, a good heat emission via the outer cap surface is achieved in order to keep the temperatures at the cap low.

It is particularly favorable, if the cap has a flange that is introduced into the housing in order to center the cap on the housing. The flange thus corresponds to a centering recess, which allows for a defined positioning of the cap on an inner circumference of the housing. Preferably, a press fit is provided between an outer circumference of the flange and an inner circumference of the housing, for example an H7/m6 fit. This further promotes a heat transfer away from the cap since the good surface contact between the cap and the housing allows for very good heat conduction from the cap into the housing. Good heat transfer from the housing is possible for example via a cylinder head into which the housing of the prechamber spark plug may be screwed.

Particularly preferred is a second geometric feature, a cross-sectional connection area of the flange and the housing, which influences a thermal connection of the cap to the housing. The cross-sectional connection area corresponds to a sum of the respective cross-sectional area of the flange and the housing in a common cross-sectional plane, this cross-sectional plane being situated in an overlapping area of the flange and the housing. That is, the cross-sectional connection area corresponds to a sum of the two annular areas of the flange and the housing in the cross-sectional plane. A second ratio of the outer cap surface area to the cross-sectional connection area is at least 1:1 and maximally 3:1. It is particularly favorable if the second ratio is 1.97:1. That is, in the case of a second ratio of 1.97:1 and an outer cap surface area of 130 mm², the cross-sectional connection area is 66 mm². This makes it possible to achieve a particularly efficient further transport of heat from the cap into the housing. This is particularly advantageous if a further heat dissipation occurs via the housing to the cylinder head into which the housing is able to be screwed and which has a cooling medium flowing through it.

A third geometric feature is preferably a cross-sectional opening area of all pass-through openings. The third geometric feature thus corresponds to a gas passage area, through which gas is able to enter from the prechamber through the cap into the combustion chamber. A third ratio of the outer cap surface area to the cross-sectional area of the opening is at least 2:1 and maximally 8:1. Particularly preferably, the third ratio is 5:1. The cross-sectional opening area of all pass-through openings is advantageously altogether 26 mm², if the outer cap surface area is 130 mm² and a third ratio of 5:1 is provided. This makes it possible to achieve an optimal ratio between the greatest possible heat transfer area and a sufficient gas passage area at the cap.

For a further optimized heat transfer in the area of the cap, the outer cap surface area is preferably set with a fourth geometric feature in a fourth ratio. The fourth geometric feature is a prechamber volume in connection with the inner cap surface area of the cap. A volume of the prechamber enclosed between the cap and the housing is regarded as the prechamber volume for this purpose. The fourth ratio of a sum of the outer cap surface area and the inner cap surface area to the prechamber volume is at least 0.2 1/mm and maximally 1 1/mm. Particularly preferably, the fourth ratio is 0.38 1/mm. The prechamber volume is preferably at 500 $mm^3$ at a fourth ratio of 0.38 1/mm and an outer cap surface area of 130 $mm^2$. Alternatively or additionally, it is advantageously possible to specify the fourth ratio in a dimensionless manner. In this case, the prechamber volume could be considered relative to an inner diameter of the cap. In particular, an inner diameter of the flange of the cap is regarded as the inner diameter. That is, a dimensionless fourth ratio would be the sum of the outer cap surface area and the inner cap surface area multiplied by the inner diameter of the cap. This product is finally set into the ratio to the prechamber volume. Such a dimensionless fourth ratio is preferably 1:6 to 2:5, particularly preferably 13:58. Since, in the event of an enlargement or reduction of the cap, the inner diameter of the cap preferably scales at the same ratio as the further geometric properties of the cap, the fourth ratio and the dimensionless fourth ratio may be regarded as equivalent. Along with this geometric scaling, it is furthermore particularly advantageous if a cap material volume has a predefined fifth ratio with respect to the prechamber volume.

Particularly preferably, the cap has a flat front side. The flat front side forms a centric area of the outer cap surface facing away from the housing, which preferably has a circular cross section. That is, the otherwise spherical or domed cap has a flattened plane area on its front side. A diameter of the flat area preferably is maximally 100%, particularly preferably 80% of the inner diameter of the cap.

The flat front side is advantageously situated in a plane, which is perpendicular to a longitudinal axis of the prechamber spark plug, in order to obtain a geometry of the prechamber spark plug that is symmetrical with respect to the longitudinal axis and that is simple to produce. Above all, this also results in a symmetrical heat absorption and heat dissipation at the cap. Additionally, the prechamber spark plug may be readily inserted into a flat area of the cylinder head. Particularly preferably, the cap additionally has a flat inner side, which forms a boundary of the prechamber in the axial direction. The flat inner side is preferably situated in parallel to the flat front side and is thus likewise perpendicular to the longitudinal axis.

It is furthermore advantageous if the cap has four pass-through openings. For this purpose, the four pass-through openings are situated in a transition area between the front side and a lateral surface of the cap. The four pass-through openings are uniformly distributed around the circumference of the cap in order to obtain a uniform distribution of the torch jets in the operation of the prechamber spark plug, which makes it possible to achieve a particularly uniform and also efficient ignition of the fuel-air mixture.

The cap and the housing are preferably connected to each other by a welded connection or alternatively by a soldered connection. This makes it possible to achieve particularly good stability and along with that a long service life of the prechamber spark plug, a good heat transfer also being thereby ensured especially from the cap to the housing. In addition, the prechamber is optimally sealed by the welded connection or soldered connection.

BRIEF DESCRIPTION OF THE DRAWINGS

An exemplary embodiment of the present invention is described in detail below, with reference to the figures.

DETAILED DESCRIPTION OF EXAMPLE EMBODIMENTS

Figure 1:
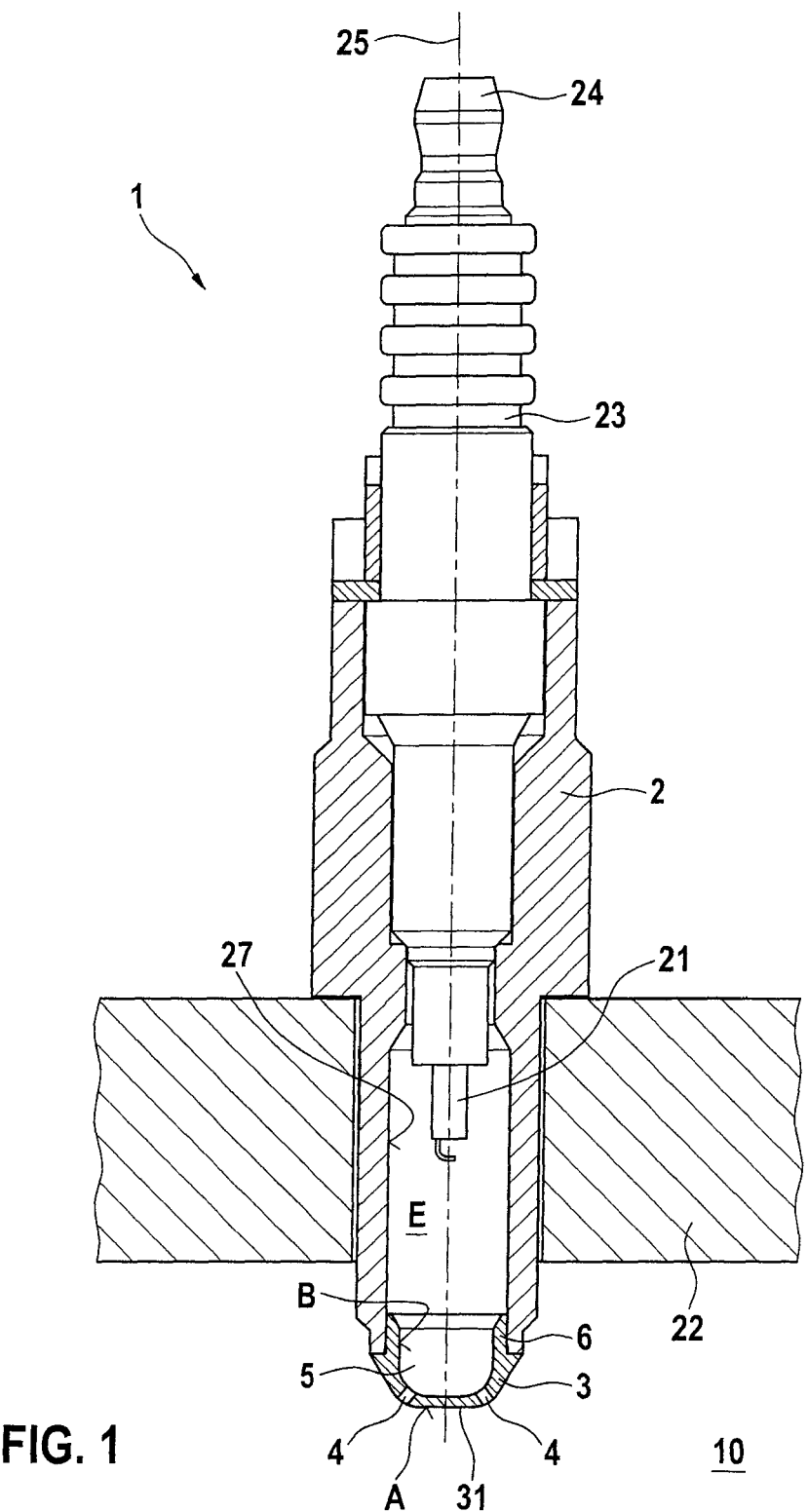
FIG. 1 shows a schematic sectional view of a prechamber spark plug according to a preferred exemplary embodiment of the present invention.
Figure 2:
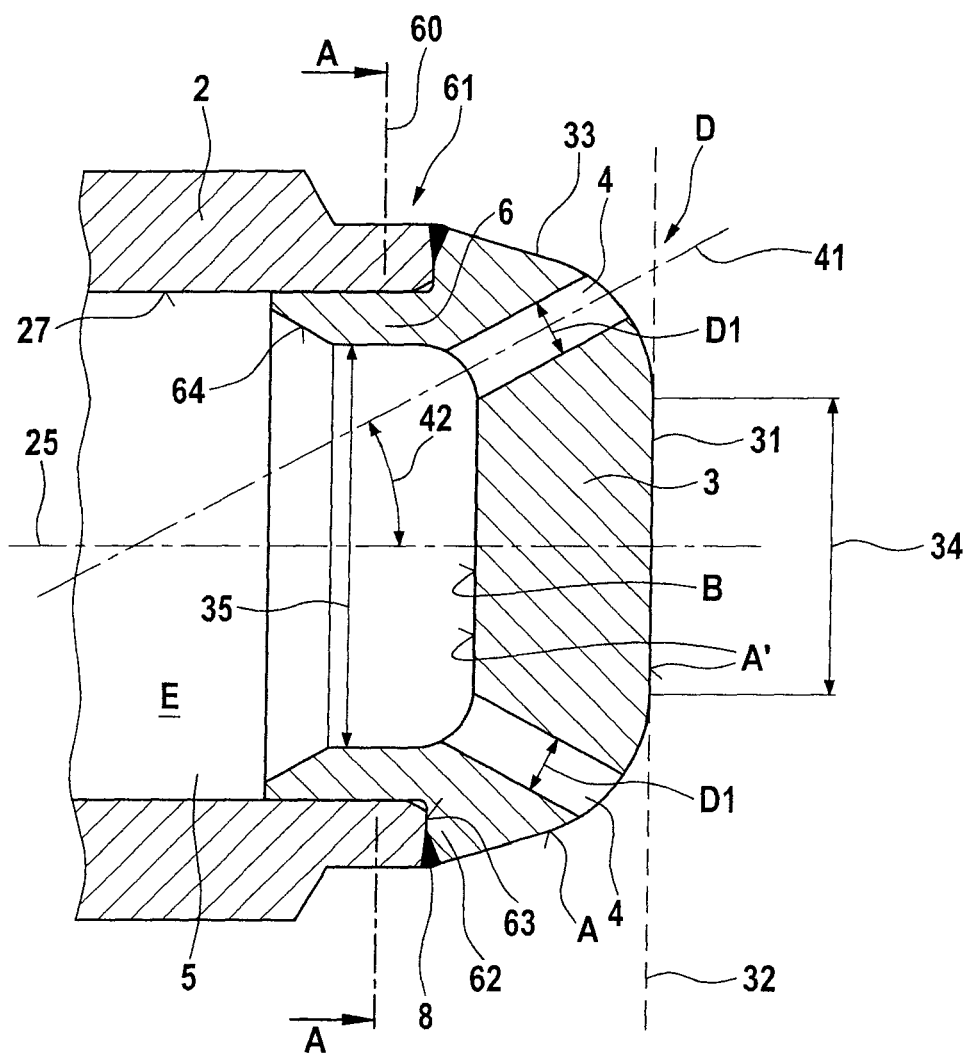
FIG. 2 shows an enlarged detail of FIG. 1.
Figure 3:
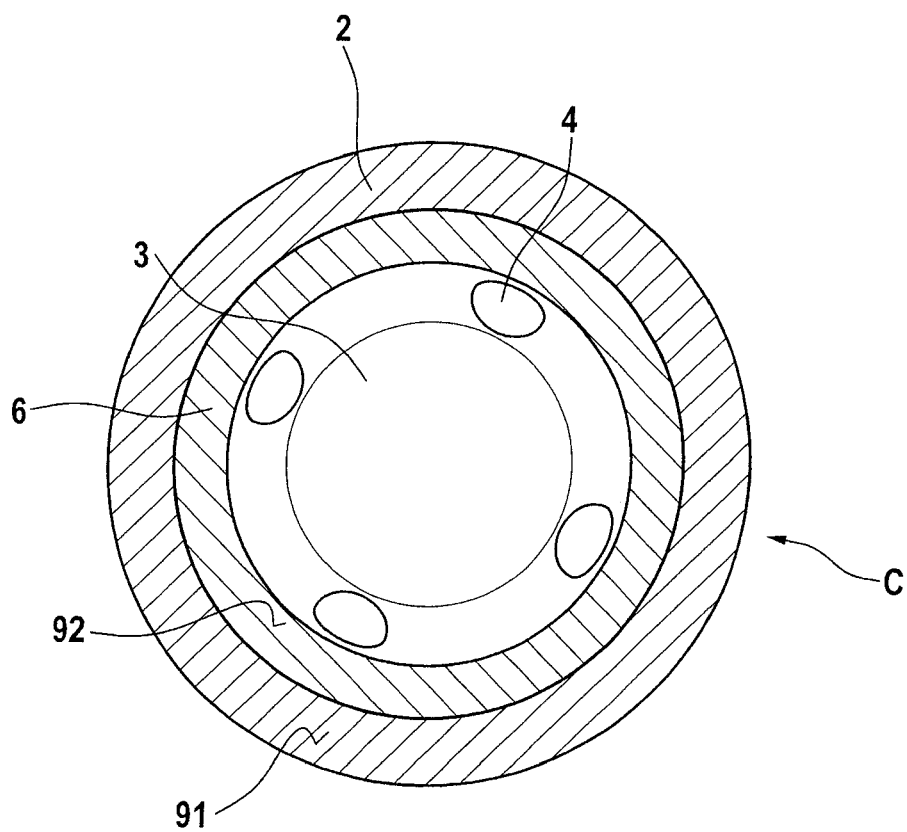
FIG. 3 shows a further schematic sectional view of the prechamber spark plug, along the sectional line A-A of FIG. 2.

With reference to FIGS. 1 to 3, a prechamber spark plug 1 according to a preferred exemplary embodiment of the present invention is described in detail below.

As may be seen in FIG. 1, prechamber spark plug 1 comprises a housing 2 and a cap 3. Cap 3 is situated on an end of housing 2 facing a combustion chamber 10. Cap 3 and housing 2 together form a prechamber 5 of prechamber spark plug 1. Prechamber spark plug 1 is shown schematically in FIG. 1 and further includes an electrode 21, an insulator 23 and an electrical terminal 24.

As shown schematically in FIG. 1, prechamber spark plug 1 is screwed into a cylinder head 22 of an internal combustion engine in such a way that cap 3 protrudes into combustion chamber 10. Cap 3 is thereby directly exposed to high temperatures in combustion chamber 10.

In order to be able to absorb and dissipate the high temperatures in the best way possible and without damage, prechamber spark plug 1 has a cap 3 that is specially designed in its geometry. Cap 3 is shown in detail in FIGS. 2 and 3. For example, cap 3 is formed from nickel so as to offer good temperature stability and heat conduction.

Cap 3 in general has a cup-like geometric shape and comprises four cylindrical pass-through openings 4 (see FIG. 3), through which torch jets produced by a first ignition of a fuel-air mixture in prechamber 5 are able to enter combustion chamber 10 in order to ignite the fuel-air mixture present therein. Pass-through openings 4 are situated in a rounded-off area of cap 3 between a lateral surface 33 and a flat front side 31 of cap 3. In addition, the respective axes 41 of pass-through openings 4 are situated at an angle 42 of 30° with respect to a longitudinal axis 25 of prechamber spark plug 1.

Lateral surface 33 is provided as a conical lateral surface. Moreover, flat front side 31 is situated perpendicularly to longitudinal axis 25 and has a diameter 34, which amounts to 80% of an inner diameter 35 of cap 3.

Cap 3 further comprises a flange 6, by which cap 3 is fastened to housing 2 of prechamber spark plug 1. The fastening here occurs in a force-locking manner by an H7/m6 press fit and in a form-locking manner by a welded connection 8 on the outer circumference. Adjacent to flange 6, a shoulder 62 is formed on cap 3, which abuts upon a front side 63 of housing 2. On an axial end of flange 6, the latter has a bevel 64.

This specially designed geometry of cap 3, which allows for the optimized heat transfer on cap 3, is described below. In this case, an outer cap surface A of cap 3, which faces away from prechamber 5, is respectively characterized by multiple predefined ratios with respect to a further geometric feature of cap 3. Outer cap surface A corresponds to the entire outer surface of cap 3 that is freely accessible outside of housing 2 and is 130 mm² in the preferred exemplary embodiment.

A first geometric feature is an inner cap surface area B of cap 3. Analogous to the definition of outer cap surface area A, inner cap surface area B corresponds to the entire surface of cap 3 facing prechamber 5. A first ratio A/B of outer cap surface area A to inner cap surface area B is in this case 2,167:1. This results in an inner cap surface area B of 60 mm².

A second geometric feature is a cross-sectional connection area C of flange 6 and housing 2. Cross-sectional connection area C corresponds to a sum of the cross-sectional areas 91, 92 of flange 6 and housing 2 in an overlapping area 61 of these two components (cf. FIGS. 2 and 3). In detail, a first cross-sectional area 91 of housing 2 and a second cross-sectional area 92 of flange 6 are located in a common cross-sectional plane 60, which is perpendicular to longitudinal axis 25. Cross-sectional plane 60 corresponds to sectional plane A-A. Outer cap surface area A has a second ratio A/C to cross-sectional connection area C of 1.97:1. Cross-sectional connection area C is thus 66 mm².

A third geometric feature is a cross-sectional opening area D of pass-through openings 4. Cross-sectional opening area D is the sum of the individual cross-sectional opening areas D1 of all pass-through openings 4. Outer cap surface area A has a third ratio A/D of 5:1 with respect to cross-sectional opening area D. This results in a cross-sectional opening area D of 26 mm².

In addition, a fourth geometric feature is a prechamber volume E in connection with inner cap surface area B. Prechamber volume E corresponds to a total volume enclosed between cap 3 and housing 1. That is, prechamber volume E is bounded by inner cap surface B as well as by an inner side 27 of housing 2. A fourth ratio A'/E constitutes a relation between outer cap surface area A, inner cap surface area B and prechamber volume E. In detail, a sum A' of outer cap surface area A and inner cap surface area B is set into a relationship with prechamber volume E. This fourth ratio A'/E is 0.38 l/mm. This yields a volume of 500 mm³ for prechamber volume E.

The geometry of cap 3 according to the present invention thus influences in a particularly advantageous manner the heat transfer on cap 3 when operating prechamber spark plug 1. The described geometric ratios are specially adapted so as to effect an optimal heat absorption and heat dissipation on cap 3. This makes it possible to avoid excessively high temperatures, which would damage the cap or could result in unwanted spontaneous ignitions of the fuel-air ratio in combustion chamber 10, in that the heat is optimally transported away from the cap both by heat radiation and well as by heat conduction.

What is claimed is:

1. A prechamber spark plug, comprising:
    a housing; and
    a cap which has at least one pass-through opening, the cap being situated on a combustion chamber-side end of the housing, the cap and the housing forming a prechamber, wherein an outer cap surface area of the cap, which faces away from prechamber, has at least one predefined ratio with respect to at least one further geometric feature of the cap,
    wherein the cap has a flange, and the flange is inserted into the housing,
    wherein a second geometric feature of the at least one further geometric feature is a cross-sectional connection area of the flange and the housing in a common cross-sectional plane in an overlapping area of the flange and the housing, and a second ratio of the outer cap surface area to the cross-sectional connection area being at least 1:1 and maximally 3:1.

2. The prechamber spark plug as recited in claim 1, wherein a first geometric feature of the at least one further geometric feature is an inner cap surface area of the cap, and a first ratio of the outer cap surface area to the inner cap surface area being at least 1:1.

3. The prechamber spark plug as recited in claim 2, wherein the first ratio is maximally 3:1.

4. The prechamber spark plug as recited in claim 2, wherein the first ratio is 2.167:1.

5. The prechamber spark plug as recited in claim 1, wherein the second ration is 1.97:1.

6. The prechamber spark plug as recited in claim 1, wherein a third geometric feature of the least one geometric feature is a cross-sectional opening area of all pass-through openings, and a third ratio of the outer cap surface area to the cross-sectional opening area being at least 2:1 and maximally 8:1.

7. The prechamber spark plug as recited in claim 6, wherein the third ratio is 5:1.

8. The prechamber spark plug as recited in claim 1, wherein a fourth geometric feature of the least one geometric feature is a prechamber volume in combination with the inner cap surface area, and a fourth ratio of a sum of the outer cap surface area and the inner cap surface area to the prechamber volume being at least 0.2:1/mm and maximally 1:1/mm.

9. The prechamber spark plug as recited in claim 8, wherein the fourth ratio is 0.38:1/mm.

10. The prechamber spark plug as recited in claim 1, wherein the cap has a flat front side.

11. The prechamber spark plug as recited in claim 10, wherein the flat front side is situated in a plane perpendicular to a longitudinal axis of the prechamber spark plug.

12. The prechamber spark plug as recited in claim 10, wherein the cap has four pass-through openings, and the pass-through openings are situated in a transitional area between the front side and a lateral surface of the cap.

13. The prechamber spark plug as recited in claim 1, wherein the cap and the housing are connected to each other by a welded connection or a soldered connection.

* * * * *